2,925,440

PHOSPHINOBORINE COMPOUNDS AND THEIR PREPARATION

Anton B. Burg, Los Angeles, and Ross I. Wagner, Montebello, Calif., assignors, by mesne assignments, to American Potash & Chemical Corporation, a corporation of Delaware No Drawing. Application June 17, 1957
Serial No. 666,213

17 Claims. (Cl. 260—606.5)

This application, which is a continuation-in-part of our copending application, Serial No. 446,147, filed July 27, 1954, relates in general to phosphinoborine polymers derived from $[H_2PBH_2]_n$ and to their production. A divisional application of the aforementioned Serial No. 446,147, which is identified as application Serial No. 754,914, filed August 14, 1958, describes and claims compounds similar to those claimed herein. More particularly, this invention relates to such phosphinoborines wherein at least one of the hydrogen atoms on the phosphorus or boron is replaced with certain monovalent or divalent cyclic organic radicals.

The materials ordinarily used in the preparation of polymers and plastic materials are organic in nature and may display unsatisfactory chemical and thermal stability under conditions of specialized usage.

It is therefore an object of this invention to provide a group of basically inorganic polymers having unusual chemical and thermal stability.

A further object of this invention is to provide methods for synthesizing phosphinoborine polymers.

Ancillary objects and advantages of this invention, if not specifically set out, will become apparent during the course of the detailed description which follows.

Broadly, it has been found that polymeric phosphinoborines may be prepared which are unusually stable. They have the general formulae:

$$[RR'PBR''R''']_n$$

wherein the symbols R, R′, R″ and R‴ represent H, aliphatic substituents or aromatic substituents, at least one of R, R′, R″ and R‴ representing an alicyclic or aromatic substituent; and:

$$[RPBR''R''']_n$$

wherein the group RP designates a heterocyclic ring including the P atom. R thus represents a portion of a heterocyclic ring. The other symbols are used as above. In the formulae, n is an integer indicative of the degree of polymerization and may be as low as 3 or 4 or much larger. Preferably, R and R′ of the first formula represent alkyl groups having less than 13 carbon atoms, lower cycloalkyl, phenyl, lower alkyl-substituted phenyl, biphenyl or naphthyl and R″ and R‴ represent hydrogen, lower alkyl or phenyl, it being borne in mind that at least one of the symbols R, R′, R″ and R‴ must represent one of the named alicyclic or aromatic substituents. Where R represents a cyclopolymethylene radical, there preferably are between three and six carbon atoms in the chain. The products can be prepared through a variety of methods. A secondary phosphine borine having three hydrogen atoms on the B may be pyrolyzed whereby to split off one hydrogen atom from both the phosphorus and the boron atoms with the production of the desired phosphinoborine. Alternatively, the desired phosphinoborine may be prepared by reacting a phosphonium halide with a borohydride of a metal such as aluminum or, preferably, with an alkali metal or an alkaline earth metal borohydride. If the borohydride is that of a metal other than an alkali metal or alkaline earth metal, it should be a volatile metallic borohydride. Also, a phosphine haloborine may be dehydrohalogenated to yield the desired phosphinoborine.

More particularly, the phosphinoborines of this invention may be of several varieties. Three or more individual RR′PBR″R‴ units may join to form a ring material, the most elementary of which, the trimer, is set forth below:

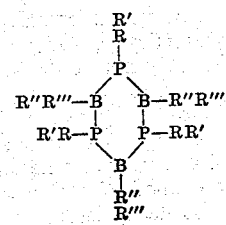

Substances of this type will be termed hereinafter ring polymeric materials. Rings may also form of considerably greater size, for example, four of the RR′PBR″R‴ units may join together to form a tetramer corresponding to the trimer set forth above.

In order to be a ring material of this type, it is essential that the compound under consideration have no free hydrogens on the phosphorus atom. If unreplaced hydrogens appear on the phosphorus, the product will not be the ring material set forth above, but rather will be a linear polymer having a series of phosphinoborine units joined one to another through adjacent phosphorus and boron atoms whereby to form an extended chain.

The preparation of these phosphinoborines can be accomplished in several ways. In one, certain secondary phosphine borines may be pyrolyzed to effect the loss of one hydrogen each from both the phosphorus and boron atoms. The reaction proceeds in according with the equation:

$$n'(RR'HP:BH_3) \longrightarrow \frac{n'}{n}[RR'PBH_2]_n + n'H_2$$

wherein n′ indicates the number of molecules present initially. All other symbols are used as in the general formula above.

It is to be noted in the equation above that the compound pyrolyzed has only hydrogen atoms adjacent the boron (excepting the P). Actually, it is possible to secure a certain amount of the desired phosphinoborine from a phosphine borine where one or more organic radicals are attached to the boron in place of the hydrogen. However, this is not the preferred method of producing these materials since the pyrolysis of a phosphine borine having one or more aliphatic radicals on the boron atom results in disproportionation which changes the phosphine borine initially present to dialkylphosphine trialkylborines and dialkylphosphine monoalkylborines at temperatures below those required for the loss of hydrogen from the RR′HP:BHR″R‴ reactant. Thus, for example, where the compound $(C_6H_5)_2HP:BH(CH_3)_2$ is pyrolyzed, quantities of $(C_6H_5)_2HP:B(CH_3)_3$ and $(C_6H_5)_2HP:BH_2CH_3$ are obtained at temperatures below those required for the obtaining of the phosphinoborine by the loss of hydrogen from the diphenylphosphine dimethylborine. Further, a certain amount of further disproportionation whereby $(C_6H_5)_2PBH_2$ and $(C_6H_5)_2PB(CH_3)_2$ units are formed is observed. And, since the formation of some $B(CH_3)_3$ in the early stages of the process results in partial suppression of the disproportionation at later stages, it is found that a mixture of polymers and copolymers of which $(CH_3)_2PBHCH_3$ units predominate with some $(C_6H_5)_2PB(CH_3)_2$ units and still lesser quantities of $(C_6H_5)_2PBH_2$ units present is obtained.

The most significant disproportionation reaction may be represented generally by the following:

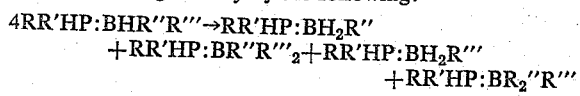

followed by a loss of $H_2$ to form phosphinoborines:

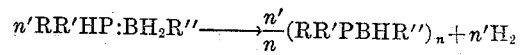

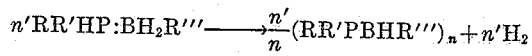

The pyrolysis reaction, where organic radicals depend from the B, thus is a method by which a mixture of polymers, some of which may not be the desired material, is obtained.

The pyrolysis may be carried out in a refluxing solvent of high boiling point such as n-butyl ether or triethylene glycol dimethyl ether. However, where pyrolysis is to be used, the preferred method of pyrolyzing phosphine borines does not necessitate the use of a solvent. Refluxing the phosphine borine itself in an inert atmosphere is an extremely simple way to remove the hydrogen. No product contamination is observed where this method is used. Refluxing until no further hydrogen evolves generally takes a period of about 30 to 60 minutes as contrasted with periods measured in hours where a solvent is employed. It is advantageous to pass the $H_2$ evolved by the reaction into a mercury bubbler—thus affording a ready method of ascertaining when the reaction is complete. Alternatively, the pyrolysis may be carried out in a flow system.

In the second method, a phosphinoborine is prepared by reacting a phosphonium halide with a borohydride of an alkali metal, an alkaline earth metal or a volatile metallic borohydride such as aluminum borohydride. The reaction proceeds in accordance with the equation:

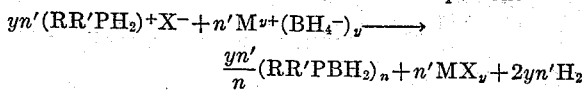

In the above equation, $y$ is a small integer corresponding to the valence of M, which preferably represents lithium, sodium, potassium, calcium, magnesium, barium, strontium or aluminum and X is a halogen. The additional symbols are used in the fashion indicated previously.

In the third method, the dehalogenation of phosphine haloborines, the reaction proceeds:

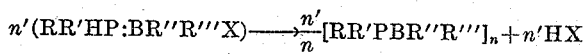

wherein X designates a halogen and each of the other symbols are used in the manner set out above. Thus, the by-product HX is a hydrohalogen acid. This is prevented from displacing the weaker acid function represented by the boron atom and H or other radicals which may be adjacent thereto (excluding the P) by providing a quantity of a tertiary amine in the reaction vessel. This reacts with the hydrohalogen acid and so removes it from the reaction mixture as a substituted ammonium salt. Where it is desired to prepare phosphinoborines having unsaturated substituents, this particular method is especially recommended. It does not necessitate the use of high temperatures which tend to saturate any unsaturated groups on the phosphorus or boron. As the reaction is not carried out at reflux temperatures, a wide variety of solvents such as any of the ethers may be employed. For example, diethyl ether is readily available and is recommended for use in the process. Another suitable solvent is benzene.

In using the dehydrohalogenation method as set forth above, it is important that the halogens be either chlorine, bromine or iodine. Fluorine will not work and is not to be used in the process. This is because of the fact that HF behaves unlike the other hydrohalogen acids. Either it will not combine with a weak base so as to form an insoluble substituted ammonium fluoride or will combine so weakly as not to carry the reaction forward. Accordingly, HF cannot be extracted from the P:B complex using a weak tertiary amine of the type suggested and a stronger base cannot be employed, such as an alkali, since the weaker phosphine base will be displaced from the phosphine borine addition compound.

Considering now the linear polymers; these may be prepared by the methods set forth above. For example, the reaction between a phosphonium halide and a borohydride of an alkali or alkaline earth metal or a volatile metallic borohydride may be employed. Where the phosphonium halide has at least three hydrogens on the phosphorus at the outset, the phosphinoborine product obtained will be linear material—as it will continue to bear at least one hydrogen on the phosphorus. The reaction is thus that set forth above for the use of a phosphonium halide and a borohydride, R' representing a hydrogen atom. Similarly, the dehydrohalogenation method set forth as the third method above, may be used and in the equation for that procedure, R' represents hydrogen. In both equations, R may represent hydrogen, in which event the phosphinoborine product will have two hydrogens bonded to the phosphorus.

The practice of this invention both with respect to performing the processes and securing the products thereof will become apparent from the following examples, which are set forth by way of illustration.

*Example I.*—Dicyclohexylphosphonium chloride $$[(C_6H_{11})_2H_2P]^+Cl^-$$

in the amount of 2.35 g. was placed in a 50 ml. round bottom flask previously flushed with nitrogen. The flask was fitted with a reflux condenser, a stirrer, and an addition funnel. Diethyl ether in the amount of 30 ml. was added to the reaction flask. Lithium borohydride, $$Li^+BH_4^-$$

in the amount of 0.22 g. dissolved in 10 ml. of diethyl ether was added slowly to the reaction flask. The flask was heated for 40 minutes to reflux and lithium chloride was filtered from a reaction mixture when hydrogen no longer evolved. The solvent was removed by distillation at reduced pressure. A high yield of the dicyclohexylphosphinoborine polymer $[(C_6H_{11})_2PBH_2]_n$, was thus obtained. The compound is a colorless crystalline solid.

Example I above relates to a process utilizing a phosphonium salt. Stoichiometry for additional runs utilizing a phosphonium salt is set forth in Table A below:

TABLE A

*Phosphonium salt process*

| Example No. | Phosphonium Salt | Grams | Borohydride | Grams | Solvent | Product |
|---|---|---|---|---|---|---|
| II | $(C_7H_{13})_2H_2PI$ | 1.20 | $Al(BH_4)_3$ | 0.36 | diethyl ether | $[(C_7H_{13})_2PBH_2]_n$ |
| III | $(C_5H_9)_2H_2PCl$ | 1.23 | $LiBH_4$ | 0.15 | do | $[(C_5H_9)_2PBH_2]_n$ |
| IV | $(C_6H_5)_2H_2PI$ | 3.03 | $NaBH_4$ | 3.72 | do | $[(C_6H_5)_2PBH_2]_n$ |

*Example V.*—Bis(p-tolyl)phosphine in an amount of 1.23 g. and diborane in an amount of 0.14 g. were condensed in a nitrogen-filled 200 ml. flask at −40° C. After formation of the phosphine borine addition product, this material was pyrolyzed at 220° C. for 12 hours to yield a large quantity of the bis(p-tolyl)phosphinoborine. The product [(p-$CH_3C_6H_4)_2PBH_2$] was obtained primarily in the form of the trimer, M.P 200° C.

The preparation of the intermediates containing the phosphorus in a heterocyclic ring may be accomplished as follows: Equal molar quantities of phosphine ($PH_3$) and sodium are reacted, the phosphine being passed into a stirred solution of the sodium dissolved in refluxing ammonia until the blue color is replaced by the yellow color of $NaPH_2$. Preferably, the by-product $H_2$ is vented through a mercury bubbler to prevent access of air into the apparatus. Other suitable means for removing the hydrogen from the reaction vessel and preventing access of air are known to the art and may be employed. An alkyl halide having the general formula $(CH_2)_aX_2$, where $a$ is at least 2 and wherein X represents a halogen, is then added to the contents of the reaction vessel until the yellow color is discharged. The alkyl halide may be added as rapidly as permitted by the apparatus used, that is, as rapidly as the quantity of alkyl halide introduced can be accepted within the given volume of the reaction vessel. The product, if sufficiently volatile at −33°, is azeotropically distilled from the reaction mixture with the solvent and then freed of residual ammonia by passing the immiscible product layer through a suitable material for adsorption of the ammonia. Recommended is anhydrous zinc sulfate at 0° C. The product is then purified by distillation. This procedure for separating the solvent and the product is suitable if the desired product is sufficiently volatile at the boiling point of ammonia, −33° C. However, where the product is high boiling, it is distilled from the reaction vessel after evaporation of the solvent and thereafter purified by fractional distillation.

*Example VI.*—Phosphine in the amount of 0.717 g. (0.0211 mol) was passed into a stirred solution of 0.4847 g. (0.02108 mol) Na dissolved in a 1 liter quantity of refluxing ammonia (−33.4° C.). The by-product, hydrogen, was vented through a series of cold traps to catch the unreacted $PH_3$ and a mercury bubbler was used to prevent access of air into the apparatus. A quantity of 1.3152 g. or 0.01935 mol of $(CH_2)_4Cl_2$ was then added, the rate of addition being limited by the capacity of the reflux condenser—the addition continuing until the yellow color disappeared from the reaction mixture. The product was relatively volatile at the boiling point of ammonia, −33° C., and was azeotropically distilled from the reaction mixture with the solvent. The immiscible product layer was freed of residual ammonia by passing it through anhydrous zinc sulfate at 0° C. and purified by distillation. A mixture of products was secured, 0.5754 g., or a yield of 45.5%, of $(CH_2)_4(PH_2)_2$ and 0.4129 g., or a yield of 45.3% of $(CH_2)_4PH$. The desired heterocyclic ring phosphine material was separated from the difunctional phosphine by distillation under vacuum with a fractional distillation column having a vapor take-off head. Thereafter the heterocyclic phosphine material in a quantity of 0.4129 g. was placed in a 500 ml. round bottom flask previously flushed with nitrogen, cooled to −30° C. and 0.0661 g. of diborane added. The addition compound which formed was heated under reflux until further hydrogen no longer evolved. A quantitative yield of the cyclotetramethylenephosphinoborine, $$[\overline{CH_2CH_2CH_2CH_2PBH_2}]_n$$

was secured. The trimeric form of this material melts at 169° C.

Examples V and VI above both relate to a process wherein a phosphine borine is pyrolyzed to yield the desired phosphinoborine. Stoichiometry relating to additional examples utilizing this type process is set forth in Table B below:

TABLE B

*Pyrolysis of a phosphine borine*

| Example No. | Phosphine Borine | Approximate Pyrolysis Temperature, °C. | Product |
|---|---|---|---|
| VII | (p-$C_6H_5C_6H_4)_2$HP:$BH_3$ | 200 | [(p-$C_6H_5C_6H_4)_2PBH_2]_n$. |
| VIII | $C_6H_5(C_8H_{17})$HP:$BH_3$ | 250 | [$C_6H_5(C_8H_{17})PBH_2]_n$. |
| IX | $\overline{CH_2(CH_2)_3HP:BH(CH_3)_2}$ 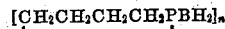 $\overline{CH_2(CH_2)_3HP:BH_3}$ | 150 | $[(CH_2)_4PBH_2]_n-[(CH_2)_4PB(CH_3)]_n'-[(CH_2)_4PBHCH_3]_n''$ (copolymer). |
| X | $\overline{CH_2(CH_2)_5HP:B(C_3H_7)_2H}$ | 230 | $[(CH_2)_6PB(C_3H_7)_2]_n-[(CH_2)_6PBHC_3H_7]_n'$ (copolymer). |

A mixture of products is secured by the reaction, one of which is a difunctional phosphine having the formula $(CH_2)_a(PH_2)_2$ and the other is the heterocyclic ring including the phosphorus atom having the general formula set forth above, $(CH_2)_aPH$ or $$\overline{CH_2(CH_2)_{a-1}PH}$$
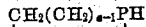

These two materials are then separated by fractional distillation, the cyclic phosphine being volatilized first. The heterocyclic phosphorus-containing compound is then reacted using any of the general procedures set forth above for the preparation of the phosphine borine.

The use of these cyclic phosphines to yield phosphinoborines is set out below.

*Example XI.*—Phenylmethylphosphine dimethylbromoborine, $C_6H_5(CH_3)HP:BBr(CH_3)_2$, in the amount of 1.673 g., was placed in a 50 ml. round bottom flask previously flushed with nitrogen. Diethyl ether in the amount of 20 ml. was added to the reaction flask. Triethylamine in the amount of 0.707 g. was also added. Triethylammonium bromide was filtered from the reaction mixture. The solvent was removed by distillation at reduced pressure. A high yield of phenylmethylphosphinodimethylborine polymer, $[C_6H_5(CH_3)PB(CH_3)_2]_n$, was obtained.

Example XI above relates to a process wherein a phosphine haloborine is dehydrohalogenated to yield the phosphinoborine desired. Stoichiometry for additional runs utilizing this type process is set forth in Table C below:

TABLE C
Dehydrohalogenation of a phosphine haloborine

| Example No. | Phosphine Haloborine | Grams | Tertiary Amine | Grams | Solvent | Product |
|---|---|---|---|---|---|---|
| XII | $C_6H_{11}(CH_3)HP:B(C_2H_5)_2Br$ | 1.12 | triethylamine | 0.40 | diethyl ether | $[(C_6H_{11})CH_3PB(C_2H_5)_2]_n$ |
| XIII | $2\text{-}C_{10}H_7(CH_3)HP:B(CH_3)_2Br$ | 1.48 | do | 0.51 | do | $[C_{10}H_7(CH_3)PB(CH_3)_2]_n$ |
| XIV | $C_6H_5(C_{12}H_{25})HP:B(CH_3)_2Br$ | 3.61 | do | 0.91 | do | $[C_6H_5(C_{12}H_{25})PB(CH_3)_2]_n$ |
| XV | $CH_2(CH_2)_3HP:B(CH_3)_2Br$ | 1.47 | do | 0.71 | do | $[(CH_2)_4P:B(CH_3)_2]_n$ |
| XVI | $C_6H_{11}H_2P:BH_2Br$ | 2.21 | dimethylaniline | 1.33 | do | $[C_6H_{11}HPBH_2]_n$ |
| XVII | $C_6H_{11}H_2P:B(CH_3)_2Br$ | 1.65 | triethylamine | 0.71 | do | $[C_6H_{11}HPB(CH_3)_2]_n$ |
| XVIII | $C_6H_5H_2P:BH_2Br$ | 2.03 | do | 1.01 | benzene | $[C_6H_5HPBH_2]_n$ |
| XIX | $C_6H_5H_2P:B(n\text{-}C_3H_7)_2Br$ | 0.26 | do | 0.13 | diethyl ether | $[C_6H_5HPB(n\text{-}C_3H_7)_2]_n$ |

In the examples which follow, the prepaartion of various "linear" polymers is set forth—these materials already having been briefly alluded to earlier. Linear polymers are phosphinoborine materials having at least one and possibly two hydrogens bonded to the phosphorus atom. They are phosphinoborines of the type $$[HRPBR''] _n$$

where R, R' and R'' represent various organic radicals or hydrogen, at least one of these representing an aromatic radical.

As in the case with the other phosphinoborines described in detail above, these hydrogen-bearing phosphinoborines may be prepared by the dehydrohalogenation of the corresponding phosphine haloborine. The pyrolysis method or the method involving reaction of a phosphonium halide with a borohydride (which also uses pyrolysis in its latter stages) may not be used as these will drive off the hydrogen subtending from the phosphorus, thus producing a highly cross linked polymer which is of little value. The dehydrohalogenation of phosphine haloborines to yield the materials having at least one hydrogen on the phosphorus proceeds as follows:

$$n'(RH_2P:BR'R''X) \xrightarrow{n'/n} (RHPBR'R'')_n + n'HX$$

wherein X is a halogen and the other symbols are used in the fashion set out earlier.

The ring materials prepared from secondary phosphine substances which are primarily the trimer with lesser amounts of the tetramer and higher polymers are predominantly solids at temperatures as high as 300° C. and display extreme resistance to heat and are chemically stable. Since they also display excellent dielectric properties, they find utility as dielectrics where higher temperatures and opportunities for chemical reaction (such as hydrolysis) are prevalent, where long chain aliphatic groups (e.g., $C_8$–$C_{12}$) are bonded to the phosphorus atom, the effects of the aromatic or alicyclic ring may be neutralized to a certain extent and the compounds may be liquids, at temperatures wherein they are advantageously used (100°–300° C.) and thus serve as chemically and thermally stable hydraulic fluids.

Phosphine borine materials are used in the examples set forth above in a number of instances. It is to be understood that they may be prepared in accordance with the procedure set out in our copending application, Serial No. 446,148, filed July 27, 1954, entitled, "Phosphine Borine Compounds and Their Preparation," now abandoned.

Obviously many modifications and variations of the invention as hereinbefore set forth may be made without departing from the spirit and scope thereof, and therefore only such limitations should be imposed as are indicated in the appended claims. For example, the invention is not limited to polymers of individual posphorinoborines, but, as set forth in the examples, includes copolymers of various of the compounds, the method of preparation of such materials being that set forth above for individual phosphinoborines excepting that mixtures of precursors are prepared at the outset.

We claim:

1. A phosphinoborine polymer of ring configuration comprising a plurality of phosphinoborine units, said polymer having the formula:

$$[RR'PBR''R''']_n$$

wherein R and R' are selected from the class consisting of (a) a single polymethylene group of from three to six carbons chain length bonded through its terminal carbon atoms to the phosphorus atom and (b) two separate radicals, said radicals being selected from the class consisting of alkyl groups having less than 13 carbon atoms, lower cycloalkyl, phenyl, lower alkyl-substituted phenyl, biphenyl and naphthyl and wherein R'' and R''' are selected from the class consisting of hydrogen, lower alkyl and phenyl, at least one of said symbols R, R', R'' and R''' representing a substituent selected from the class consisting of phenyl, lower alkyl-substituted phenyl, biphenyl and naphthyl and wherein $n$ is an integer from 3 to 4 indicative of the degree of polymerization.

2. The polymer of claim 1 wherein at least one of R, R', R'' and R''' is tolyl.

3. The polymer of claim 1 wherein at least one of R, R', R'' and R''' is phenyl.

4. The polymer of claim 1 wherein both R'' and R''' are hydrogen.

5. The structure of claim 1 wherein at least one of R and R' are lower cycloalkyl.

6. The structure of claim 1 wherein R'' and R''' are both lower alkyl.

7. A phosphinoborine polymer of ring configuration comprising a plurality of phosphinoborine units, said polymer having the formula $$[CH_2(CH_2)_xPBR''R''']_n$$

wherein R'' and R''' are selected from the class consisting of hydrogen, lower alkyl and phenyl, wherein $x$ is an integer of from 2 to 5 and wherein $n$ is an integer of from 3 to 4 indicative of the degree of polymerization.

8. A phosphinoborine polymer of ring configuration comprising a plurality of phosphinoborine units, said polymer having the formula $[(C_6H_5)_2PBR''R''']_n$ wherein R'' and R''' are selected from the class consisting of hydrogen, lower alkyl and phenyl and wherein $n$ is an integer of from 3 to 4 indicative of the degree of polymerization.

9. A phosphinoborine polymer of ring configuration comprising a plurality of phosphinoborine units, said polymer having the formula $[R(C_6H_5)PBR''R''']_n$ wherein R is an alkyl group of less than 13 carbon atoms and wherein R'' and R''' are selected from the class consisting of hydrogen, lower alkyl and phenyl and wherein $n$ is an integer of from 3 to 4 indicative of the degree of polymerization.

10. A polymer of the formula $[(C_6H_{11})_2PBH_2]_n$ where $n$ is an integer of from 3 to 4 indicative of the degree of polymerization.

11. A polymer of the formula $$[C_6H_5(CH_3)PB(CH_3)_2]_n$$

where $n$ is an integer of from 3 to 4 indicative of the degree of polymerization.

12. A polymer of the formula $[(CH_3C_6H_4)_2PBH_2]_n$ where $n$ is an integer of from 3 to 4 indicative of the degree of polymerization.

13. A polymer of the general formula:

$$[(C_6H_5)_2PBH_2]_n$$

wherein $n$ is an integer from 3 to 4 indicative of the degree of polymerization.

14. A polymer having the general formula:

$$[C_6H_5(CH_3)PBH_2]_n$$

wherein $n$ is an integer from 3 to 4 indicative of the degree of polymerization.

15. A polymer of the general formula:

$$[(p\text{-}C_6H_5C_6H_4)_2PBH_2]_n$$

wherein $n$ is an integer from 3 to 4 indicative of the degree of polymerization.

16. A polymer of the general formula:

$$[CH_2(CH_2)_3PBH_2]_n$$

wherein $n$ is an integer from 3 to 4 indicative of the degree of polymerization.

17. The copolymer having the formula $$[C_6H_5(CH_3)PB(CH_3)_2]_m[(C_6H_5)_2PB(CH_3)_2]_n$$

where the sum of $m$ and $n$ is 3 and where $m$ is 1–3 and $n$ is 3–1.

References Cited in the file of this patent

Burg et al.: "Amer. Chem. Soc. Jour.," vol. 75, pp. 3872–3877 (1953).

Hewitt et al.: "Chemical Society Journal" (London), pp. 530–534 (1953). Publ. February 1953; received in Patent Office Library April 1, 1953.